(12) United States Patent
Ahles

(10) Patent No.: US 7,668,776 B1
(45) Date of Patent: Feb. 23, 2010

(54) SYSTEMS AND METHODS FOR SELECTIVE USE OF RISK MODELS TO PREDICT FINANCIAL RISK

(75) Inventor: Daniel Ahles, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 1115 days.

(21) Appl. No.: 10/041,765

(22) Filed: Jan. 7, 2002

(51) Int. Cl.
*G06Q 40/00* (2006.01)
*G07F 19/00* (2006.01)

(52) U.S. Cl. .............................. 705/38; 705/35; 705/42; 235/379; 235/380

(58) Field of Classification Search ................... 705/35, 705/38, 44, 36 R, 42, 39, 16, 40; 235/379, 235/380
See application file for complete search history.

(56) References Cited

U.S. PATENT DOCUMENTS

| | | | |
|---|---|---|---|
| 5,175,682 A | 12/1992 | Higashiyama et al. | |
| 5,237,159 A | 8/1993 | Stephens et al. | |
| 5,444,616 A | 8/1995 | Nair et al. | |
| 5,484,988 A | 1/1996 | Hills et al. | |
| 5,677,955 A | 10/1997 | Doggett et al. | |
| 5,679,938 A | 10/1997 | Templeton et al. | |
| 5,679,940 A * | 10/1997 | Templeton et al. | 235/380 |
| 5,691,524 A | 11/1997 | Josephson | |
| 5,703,344 A | 12/1997 | Bezy et al. | |
| 5,801,366 A | 9/1998 | Funk et al. | |
| 5,848,400 A | 12/1998 | Chang | |
| 5,848,412 A | 12/1998 | Rowland et al. | |
| 5,920,847 A | 7/1999 | Kolling et al. | |
| 5,930,777 A | 7/1999 | Barber | |
| 5,991,758 A | 11/1999 | Ellard | |
| 6,059,185 A | 5/2000 | Funk et al. | |
| 6,097,834 A | 8/2000 | Krouse et al. | |
| 6,117,011 A | 9/2000 | Lvov | |
| 6,164,528 A | 12/2000 | Hills et al. | |
| 6,189,785 B1 | 2/2001 | Lowery | |
| 6,247,000 B1 | 6/2001 | Hawkins | |
| 6,283,366 B1 | 9/2001 | Hills et al. | |
| 6,354,491 B2 | 3/2002 | Nichols et al. | |
| 6,411,942 B1 | 6/2002 | Fujimoto | |
| 6,430,539 B1 | 8/2002 | Lazaris et al. | |
| 6,647,376 B1 | 11/2003 | Ferrar | |
| 6,658,393 B1 | 12/2003 | Basche et al. | |
| 6,661,910 B2 | 12/2003 | Jones et al. | |
| 6,757,664 B1 | 6/2004 | Cardinal et al. | |

(Continued)

OTHER PUBLICATIONS

Piskora, Beth. "Three big check acceptance companies sign up with fledgling verification outfit". American Banker, New York, NY, Jan. 30, 1996. vol. 161, Iss. 19.*

(Continued)

*Primary Examiner*—Kelly Campen
(74) *Attorney, Agent, or Firm*—Sutherland Asbill & Brennan LLP

(57) ABSTRACT

A risk system that performs a risk assessment of a financial transaction to obtain a first risk score, and based on first risk score performs post-score assessments by selectively utilizing various scoring models and databases. The post-score process re-assesses some of the borderline risks in order to capture beneficial transactions that may fail standard risk assessments that use a cutoff risk score to divide the transactions into either authorized or declined groups.

9 Claims, 8 Drawing Sheets

U.S. PATENT DOCUMENTS

| | | |
|---|---|---|
| 6,839,682 B1 | 1/2005 | Blume et al. |
| 6,999,943 B1 | 2/2006 | Johnson et al. |
| 7,200,578 B2 | 4/2007 | Paltenghe et al. |
| 7,251,624 B1 | 7/2007 | Lee et al. |
| 7,275,046 B1 | 9/2007 | Tritt et al. |
| 7,333,953 B1 | 2/2008 | Banaugh et al. |
| 2001/0037299 A1 | 11/2001 | Nichols et al. |
| 2002/0032645 A1 | 3/2002 | Nozaki |
| 2002/0040344 A1 | 4/2002 | Preiser et al. |
| 2002/0052852 A1 | 5/2002 | Bozeman |
| 2002/0091550 A1 | 7/2002 | White et al. |
| 2002/0116323 A1* | 8/2002 | Schnall ......................... 705/38 |
| 2002/0178112 A1 | 11/2002 | Goeller et al. |
| 2003/0023557 A1 | 1/2003 | Moore |
| 2003/0032645 A1 | 2/2003 | Gilbert |
| 2003/0033252 A1 | 2/2003 | Buttridge et al. |
| 2003/0093368 A1 | 5/2003 | Manfre et al. |
| 2003/0217003 A1 | 11/2003 | Weinflash |
| 2004/0034583 A1 | 2/2004 | Lanier et al. |
| 2004/0044606 A1 | 3/2004 | Buttridge et al. |

OTHER PUBLICATIONS

Kreis, J. Daniel "Comment: Don't Overreact to Changes in Credit Scores" Mar. 17, 1998 American Banker; vol. 163, No. 51; p. 14.*

Kumar et al. "Reengineering the lending procedure for small businesses: a case study". Work Study. London. 1999. vol. 48, Iss. 1.*

Wayne Mattingly "Messenger-Inquirer, Owensboro, Ky., Wayne Mattingly Column" Mar. 20, 2000 Messenger-Inquirer, Owensboro, Ky.*

Robida et al. "How many scorecards do I need for my business lending environment?" Jun. 2000 Business Credit, v 102, n 6, p. 36-38.*

Morrison, Jeff, "Introducing C.A.R.T. to the forecasting process" The Journal of Business Forecasting, Spring 1998, pp. 9-12.

Supplemental Disclosure Under 37 C.F.R. 1.56 dated Mar. 31, 2009, filed for U.S. Appl. No. 10/041,765.

Disclosure Under 37 C.F.R. 1.56.

Piskora, Beth, "Three big check acceptance companies sign up with fledgling verification outfit". American Banker, Jan. 30, 1996. vol. 161, Iss. 19, (3 pages), New York, NY.

Kumar, Ashok & Motwani, Jaideep, "Reengineering the lending procedure for small businesses: a case study". Work Study. 1999. vol. 48, Iss. 1. (11 pages), London.

* cited by examiner

Sample Scoring Variables

| VARIABLE | Comment |
|---|---|
| RISK_PNC | Risk Positive-negative code (history) |
| LTD_DAYS | Life to date days |
| LTD_CNT | Life to date check count |
| LTD_AMT | Life to Date Amount |
| CHECK_NUMBER | Check Number |
| TOTAL_CHKS | Total Checks |
| CHECK_AMT | Check Amount |
| TOD | Time of Day |
| PREV_HR | Previous Hour |
| TOTAL_AMT | Total Amount |
| DAW | Day of Week |
| RISK_SCORE | Transaction Risk |
| RISK_MERCHANT | Merchant Risk |
| VELOCITY | Relative Frequency Count |
| VEL_AMT | Relative Frequency Amount |
| PROFILE_RISK | Profile Transaction Risk |
| OOS | Out of State |
| RT_INDEX | RT Index |
| NC | National Code |
| PCT_CUTOFF | % From Cutoff |
| CHK_STOLEN | Check stolen |
| AVS_RESP | Address/ID verification |
| MERCHANT_LIMIT | Merchant limit |
| CUTOFF_SCORE | Cutoff risk score |
| COLLECTION_PROB | Collection probability |
| COLLECTED_CHKS_1YR | # of Collected checks in past year |
| RETURNED_CHKS_1YR | # of Returned check in past year |
| FRAUD_PROB | Merchant fraud probability |
| TOTAL_CHKS_1YR | # of checks submitted by merchant |
| CHECK_VELOCITY_MERCHANT | Check submission rate |

SYSTEMS AND METHODS FOR SELECTIVE USE OF RISK MODELS TO PREDICT FINANCIAL RISK

BACKGROUND OF THE INVENTION

1. Field of the Invention

This invention relates generally to risk assessment, and more particularly to systems and methods of evaluating risks associated with financial transactions.

2. Description of the Related Art

Most financial transactions involve a customer making a payment in exchange for goods or services from a merchant. Many times the payment is in a promissory form that instructs the customer's bank to pay the merchant. A check is one example of such promissory form of payment. As is well known the funds promised by the check are sometimes not paid due to reasons such as insufficient funds in the customers' checking accounts or fraud. Thus, the merchant is taking a risk whenever a check is received as a payment. Many merchants maintain local databases that include, for example, a list of checkwriters that have written bad checks in the past. Such databases may range from a simple list on paper for a small store owner to a computer network for a chain store. As is known in the art, managing such databases requires use of merchants' resources that could otherwise be used more beneficially.

In order to manage financial transaction risks, many merchants subscribe to an agency that assesses risks associated with financial transactions. For a given transaction, a subscribed merchant sends a transaction approval request to the agency with information such as check amount, check identifying information, and information about the checkwriter. The agency assesses the risk and generates a risk score based on the information received. The agency then either authorizes or declines the transaction based on the risk score. Some examples of these risk assessment agencies include TeleCheck and Equifax. The level of subscription to such an agency can vary, from an approval service to the agency assuming the risk of the transaction by either guaranteeing the check or purchasing the check from the merchant. Thus it is in the interest of the agency to accurately assess the transaction risks.

In order to assess a transaction risk, check approval agency typically calculates a risk score by inputting information about the check, checkwriter, and the merchant into one or more algorithms. The algorithms then return the risk score that is indicative of the transaction risk. Traditional check approving process typically comprises a cutoff risk score such that a transaction whose risk score is higher than the cutoff risk score is authorized. Conversely, a transaction whose risk score is lower than the cutoff risk score is declined. Such approval process is generally configured to statistically favor the merchant or the check approving agency in terms of probable risk. As a consequence, the cutoff risk score selected causes decline of many check transactions that have borderline risk scores.

Significant portion of the declined transactions, however, are beneficial to both the merchant and the check approving agency. As an example, a checkwriter whose check "bounces" occasionally due to careless bookkeeping, but always ends up paying for the bounced check plus a substantial fee, is ultimately beneficial to the merchant or the agency; however, the bounced check history will most likely reflect negatively and may lead to a decline decision by the agency. Traditional risk assessments performed by check approval agencies are not able to evaluate such specific situations very well, and thus do not benefit as much from such potentially beneficial transactions.

Hence, there is a need for improved and more precise scoring methods for determining whether to authorize or decline checks written by customers. To this end, there is a need for a system and method that is better able to distinguish between a high risk transaction wherein the checkwriter will most likely be unable or unwilling to cover the check and a medium risk transaction wherein the checkwriter will, in all likelihood, be able to cover the check at a later time plus pay the additional service fees.

SUMMARY OF THE INVENTION

The aforementioned needs are satisfied by one aspect of the invention that relates to a method for processing checks that utilizes a first scoring process to determine an initial risk score for a check transaction. The method then evaluates the initial risk score for the check transaction to determine whether to utilize a second scoring process. The method comprises receiving a request from a merchant to evaluate the risk associated with a check transaction and determining with a first scoring process an initial risk score based on transaction data associated with the check transaction. The method then determines based on the initial risk score whether to decline the check transaction. The method selectively utilizes, based at least in part on the initial risk score, a second scoring process which determines a second risk score, where the second scoring process is different than the first scoring process. The method authorizes the check transaction bases at least in part on the second risk score, and provides the authorization of the check transaction to the merchant.

In one embodiment, the request comprises receiving an electronic request from the merchant. Determining the initial risk score comprises invoking a first scoring model from a plurality of scoring models. The first scoring model calculates the initial risk score based on the transaction data. The transaction data comprises information about the check, the writer of the check, and the merchant. The initial risk score is based on the combination of information about the check, the writer of the check, and the merchant.

Determining whether to decline the check comprises comparing the initial risk score to a predetermined first cutoff score. The check is declined if the initial risk score is lower than the first cutoff score. In one implementation, the predetermined first cutoff score comprises a score of 500 on a normalized score scale of 0 to 1000.

Selectively utilizing the second scoring process comprises invoking a second scoring model from the plurality of scoring models if the check is declined based on the initial risk score. The selected second scoring model calculates the second risk score based on the initial risk score and the transaction data. Selectively utilizing the second scoring process further comprises accessing one or more external databases to obtain additional information if necessary.

Authorizing the check transaction comprises comparing the second risk score to a predetermined second cutoff score. The check is authorized if the second risk score is higher than the second cutoff score. In one implementation, the predetermined second cutoff score comprises a score of 500 on a normalized score scale of 0 to 1000. Providing the authorization of the check transaction to the merchant comprises electronically transmitting either decline or authorize decision electronically.

Another aspect of the invention relates to a method for processing financial transactions that utilizes a first scoring process to determine a first risk score for a financial transaction. The method the evaluates the first risk score associated with the financial transaction to determine whether to utilize a second scoring process. The method comprises receiving a request from a merchant to evaluate the risk associated with a financial transaction, and determining with a first scoring process a first risk score for the financial transaction. The method then determines based on the first risk score whether the financial transaction should be authorized or declined. If the financial transaction is declined, the method determines based at least in part on the value of the first risk score whether to perform a second scoring process which determines a second risk score. The second scoring process is different than the first scoring process. The method determines based at least in part on the second risk score whether the financial transaction should be authorized or declined.

In one embodiment, the financial transaction is a check transaction. Receiving the request comprises receiving an electronic request. Receiving the electronic request comprises receiving transaction data, where the transaction data comprises information about the check, the writer of the check, and the merchant.

Determining the first risk score comprises invoking a first scoring model from a plurality of scoring models. The first scoring model calculates the first risk score based on the transaction data. The first risk score is based on the combination of information about the check, the writer of the check, and the merchant.

In one implementation, the first risk score depends on the amount of the check. The first risk score also depends on check writing history of the checkwriter. A positive-negative-code that is indicative of the check writing history is assigned to the checkwriter. The positive-negative-code ranges from 0 to 80, where the code of 80 is assigned to ideal checkwriters and progressively lower codes are assigned to checkwriters with progressively higher risks.

In one implementation, the first risk score also depends on rate at which the merchant submits transaction requests. The rate being greater than an average rate by a predetermined amount is considered to pose higher risks for the transactions.

Determining whether to authorize the transaction comprises comparing the first risk score to a predetermined first cutoff score. The transaction is authorized if the first risk score is higher than the predetermined first cutoff score. In one implementation the predetermined first cutoff score comprises a score of 500 on a normalized score scale of 0 to 1000.

Determining the second risk score comprises invoking a second scoring model from the plurality of scoring models if the transaction is declined based on the first risk score. The selected second scoring model calculates the second risk score based on the first risk score and the transaction data. Determining the second risk score further comprises accessing one or more external databases to obtain additional information if necessary.

Authorizing the financial transaction comprises comparing the second risk score to a predetermined second cutoff score. The transaction is authorized if the second risk score is higher than the second cutoff score. In one implementation the predetermined second cutoff score comprises a score of 500 on a normalized score scale of 0 to 1000.

Yet another aspect of the invention relates to a method for processing financial transactions comprising determining a first risk score for a financial transaction and determining based at least in part on the first risk score, whether to determine a second risk score. In one embodiment the financial transaction is a check transaction.

Determining the first risk score comprises obtaining data associated with the financial transaction and evaluating the data. Obtaining the data comprises receiving a transaction authorization request from a merchant. Evaluating the transaction comprises invoking a first scoring model from a plurality of scoring models. The first scoring model calculates the first risk score.

Determining whether to determine the second risk score comprises evaluating the first risk score. The second risk score is determined if the first risk score is lower than a predetermined first cutoff value; the transaction is authorized otherwise. The method further comprises determining the second risk score and determining whether to authorize the transaction.

Determining the second risk score comprises invoking a second scoring model from the plurality of scoring models. The second scoring model calculates the second risk score. Determining whether to authorize the transaction comprises evaluating the second risk score. The transaction is authorized if the second risk score is higher than a predetermined second cutoff score.

Yet another aspect of the invention relates to an apparatus for processing financial transactions that utilizes a first scoring model to determine a first risk score for a financial transaction. The apparatus is configured to evaluate the first risk score for the financial transaction to determine whether to utilize a second scoring model. The apparatus comprises a financial transaction request and a first scoring model that is configures to determine a first risk score associated with the financial transaction request. The apparatus further comprises a second scoring model that is configured to determine a second risk score associated with the financial transaction. The second scoring model is different than the first scoring model. The apparatus further comprises a risk engine that is configured to receive the transaction request and invoke the first scoring model. The risk engine is further configured to invoke, based at least in part on the value of the first risk score, the second scoring model so as to determine whether to authorize the financial transaction request.

In one embodiment the financial transaction is a check transaction. The financial transaction request is an electronic request transmitted from the merchant. The electronic request comprises transaction data.

The first scoring model is a software module programmed to calculate the first risk score. In one implementation, the first scoring model is one of approximately 1200 software modules. Approximately 66 of the software modules are neural networks that may be used as the first scoring model.

The second scoring model is a software module programmed to calculate the second risk score. In one implementation, the second scoring model is one of approximately 1200 software modules, some of which are neural networks.

The risk engine comprises a plurality of rules that determine the manner in which the financial transaction request is processed. The plurality of rules include pre-score rules that filter out financial transaction requests determined to be of high risk. The plurality of rules also include a scoring rule matrix that determines the manner in which the first risk score is determined. The risk engine selects the first scoring model according to the scoring rule matrix based on the transaction data so as to obtain the first risk score. The first scoring model calculates the first risk score based on the transaction data that includes information about the check, checkwriter, and merchant associated with the transaction.

The information about the check includes amount of the check. The information about the checkwriter includes a positive-negative-code that is indicative of the check writing history of the checkwriter. In one implementation, the positive-negative-code has a value that ranges from 0 to 80, where the positive-negative-code value of 80 represents an ideal checkwriter. The positive-negative-code value of 0 indicates a risk due to one or more returned checks that are not paid. The positive-negative-code values between 0 and 80 are indicative of risks therebetween.

The risk associated with the merchant includes a rate at which check transaction request is received from the merchant. The rate being higher than an average value by a predetermined amount poses higher risks for the transactions.

The risk engine authorizes the transaction if the first risk score is higher than a predetermined first cutoff score. In one implementation, the predetermined first cutoff score is a score of 500 on a normalized score scale of 0 to 1000.

The plurality of rules include post-score rules that are invoked based on the first risk score. The post-score rules are invoked if the transaction is declined due to the first risk score. The risk engine determines, according to the post-score rules, the manner in which the second risk score is obtained. The risk engine selects, according to the post-score rules, the second scoring model based on the first risk score and the transaction data so as to obtain the second risk score. The risk engine also selectively accesses one or more external databases according to the post-score rules to obtain additional information about the transaction.

The risk engine obtaining the second risk score according to the post-score rules permits the transaction to be evaluated more specifically such that risk associated with the transaction is determined more accurately. The risk engine authorizes or declines the transaction based on the second risk score.

Yet another aspect of the invention relates to an apparatus for processing financial transactions. The apparatus comprises a first module configured to determine a first risk score for a financial transaction, and a second module configured to determine based at least in part on the first risk score, whether to determine a second risk score.

In one embodiment, the financial transaction is a check transaction that is processed electronically. The first module is a first computer processor programmed to obtain data associated with the financial transaction. The first module is further programmed to determine the first risk score for the financial transaction. The first module comprises a first scoring model that includes one or more algorithms configured to calculate the first risk score based on the transaction data. The first module either authorizes or declines the transaction based on the first risk score.

The second module is a second computer processor programmed to evaluate the first risk score. The second module determines the second risk score if the transaction is declined based on the first risk score. The second module comprises a second scoring model that includes one or more algorithms configured to calculate the second risk score based on the first risk score and the transaction data. The second module either authorizes or declines the transaction based on the second risk score.

The second scoring model is different from the first scoring model. The second risk score represents a more accurate risk assessment for a given transaction such that a portion of the transactions that are declined based on the first risk score are authorized based on the second risk score.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 7 illustrates a table of sample variables that are used in the risk assessment.

DETAILED DESCRIPTION OF THE PREFERRED EMBODIMENT

Figure 1:
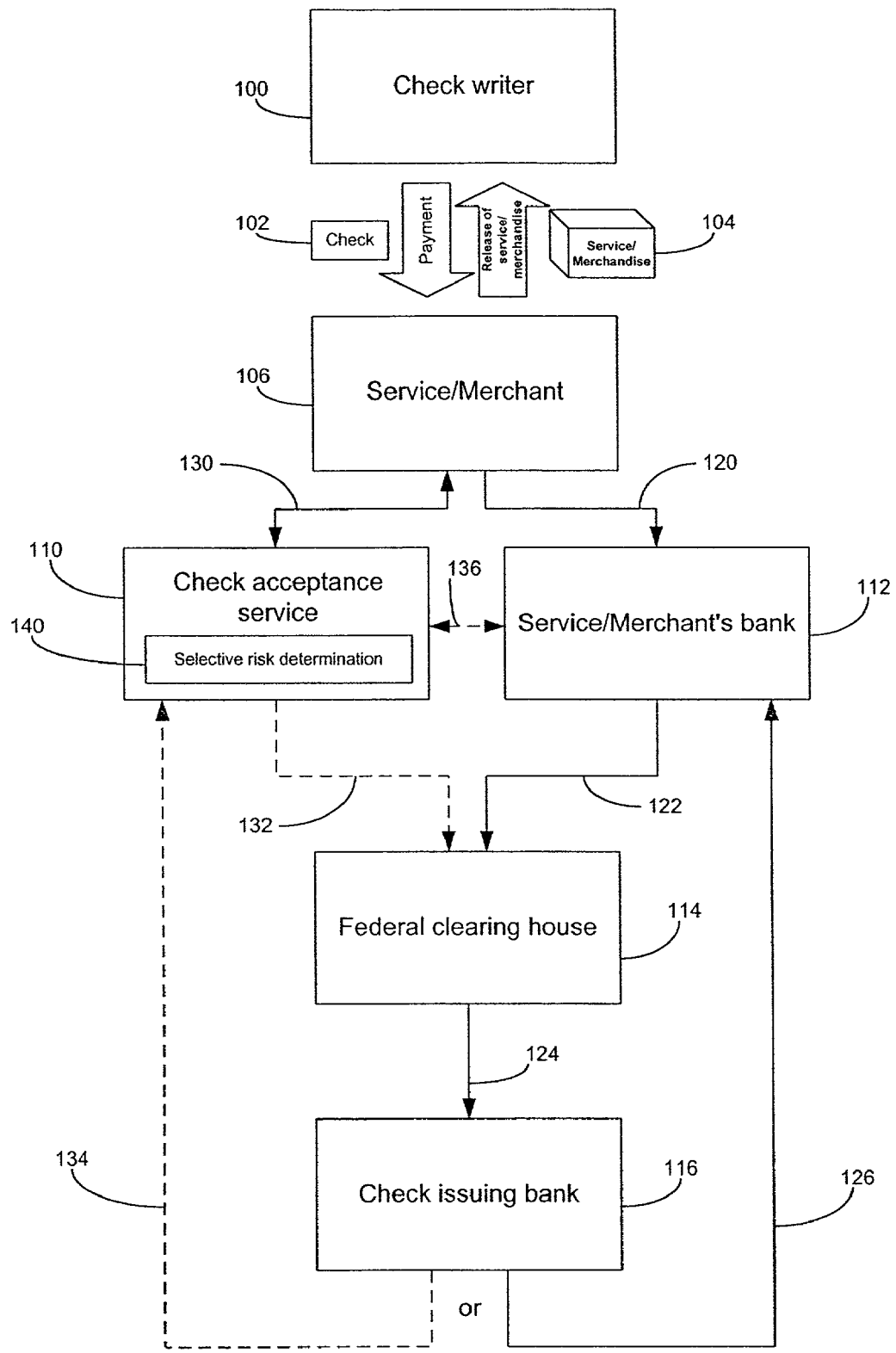
FIG. 1 illustrates a check transaction process, including a selective risk determination by a check acceptance service.

Reference will now be made to the drawings wherein like numerals refer to like parts throughout. FIG. 1 illustrates block diagram of a typical financial transaction involving a check. A checkwriter 100 writes a check 102 to a service/merchant 106 (referred to as merchant hereinafter) in exchange for a service/merchandise 104 (referred to as merchandise hereinafter). The check 102 may be accepted and deposited into a merchant's bank 112 without receiving any external authorization as indicated by path 120. Such a check 102 goes through a clearing process that is well known, wherein the merchant's bank 112 sends the check 102 to a federal clearing house 114 as indicated by path 122. The federal clearing house 114, in turn, sends the check 102 to the check issuing bank 116 as indicated by path 124. If the check 102 is considered to be valid, the check "clears" and the check's amount is debited from the checking account in the checkwriter's bank 116 and is then transferred to the merchant's bank 112, as indicated by path 126 to complete the transaction successfully.

In many transactions, however, the check 102 does not clear for various reasons, and the merchant's bank account is not credited with the check amount. Some of those reasons include non-sufficient fund (NSF) in the checking account, stop payment request by the checkwriter 100, and a fraudulent check. When the check 102 does not clear, the merchant 106 is left with the responsibility of collecting the proper fund or the merchandise 104 from the checkwriter 100. In many instances the merchant 106 is unsuccessful in such a collection process, and the already released merchandise is generally written off as a loss. Alternatively, even when the merchant 106 is successful in ultimately collecting the check amount, the merchant's costs associated with the transaction have been significantly increased. To reduce the chance of further loss from the same "bad" checkwriter, the checkwriter's name may be added to a negative list, which is in essence a local database. However, as discussed above, the local database offers only limited protection against checkwriters who have previously bounced checks in the merchant's establishment. Checkwriters who have not bounced checks in the merchant's establishment, but have a history of bouncing checks or writing fraudulent checks elsewhere are unlikely to be detected by such a local database.

As a consequence, many merchants decide to subscribe to and rely on a check acceptance service 110 to manage risks associated with accepting checks from customers. The interaction between the merchant 106 and the check acceptance service 110 is indicated by path 130. The scope of service that the merchant 106 subscribes to varies, and three exemplary subscriptions are described below.

A first exemplary subscription comprises the check acceptance service 110 informing the merchant 106 to accept or refuse the check 102 based on the risk associated with the transaction. If the check is authorized and accepted, the check 102 then goes through the clearing process via the merchant's bank 112 in a manner similar to that described above. The merchant, however, still assumes the risk associated with the transaction if the clearing process is not completed successfully.

A second exemplary subscription comprises the check acceptance service 110 guaranteeing the worthiness of the check 102 based on the risk associated with the transaction. The check 102 goes through the clearing process via the merchant's bank 112 in a manner similar to that described above. If the check 102 does not clear, however, the check acceptance service 110 pays the merchant 106 the check's amount, and assumes the responsibility of collecting from the checkwriter 100.

A third exemplary subscription comprises the check acceptance service 110 buying the check 102 outright from the merchant 106 based on the risk associated with the transaction. In such subscription, the transaction is complete, as far as the merchant 106 is concerned, when the merchant 106 accepts the check 102 upon approval from the check acceptance service 110. In many cases the check acceptance service 110 is electronically linked to the merchant's bank 112, as indicated by path 136, to transfer funds. The check acceptance service 110 assumes the responsibility of having the check 102 cleared. The check 102 is sent from the check acceptance service 110 to the federal clearing house 114 as indicated by path 132. The check 102 is then sent to the check issuing bank 116 as indicated by the path 124. If the check 102 is valid, fund is transferred from the check issuing bank 116 to the check acceptance service 110 as indicated by path 134, and the transaction is completed for the check acceptance service 110 as well. If the check 102 does not clear, the check acceptance service 110 assumes the responsibility of collecting from the checkwriter 100.

As is understood in the art, different subscriptions have different fee schedules that are generally determined by risks associated with the subscriptions. It will be appreciated that the success of the check acceptance service, including profitability, depends on accurately assessing risks associated with check related transactions. For example, if the check acceptance service gives wrong decisions to merchants that have the first exemplary subscription described above, the merchants may end up accepting high risk checks and/or refusing beneficial customers such that some dissatisfied merchants may discontinue the subscription. As for the exemplary subscriptions wherein the check acceptance service either guarantees or buys the checks, such as the second and third exemplary subscriptions described above, the risks assumed by the check acceptance service is directly related to the accuracy of risk assessments.

One aspect of the invention comprises a selective risk determination 140 by the check acceptance service 110 in manners described below. It will be appreciated that while the description herein addresses a check transaction, the inventive concepts and methods disclosed are applicable to other types of transactions that involve risks. These types of transaction may include, but is not limited to, credit card transaction, loan application, insurance application, and job application.

Figure 2:
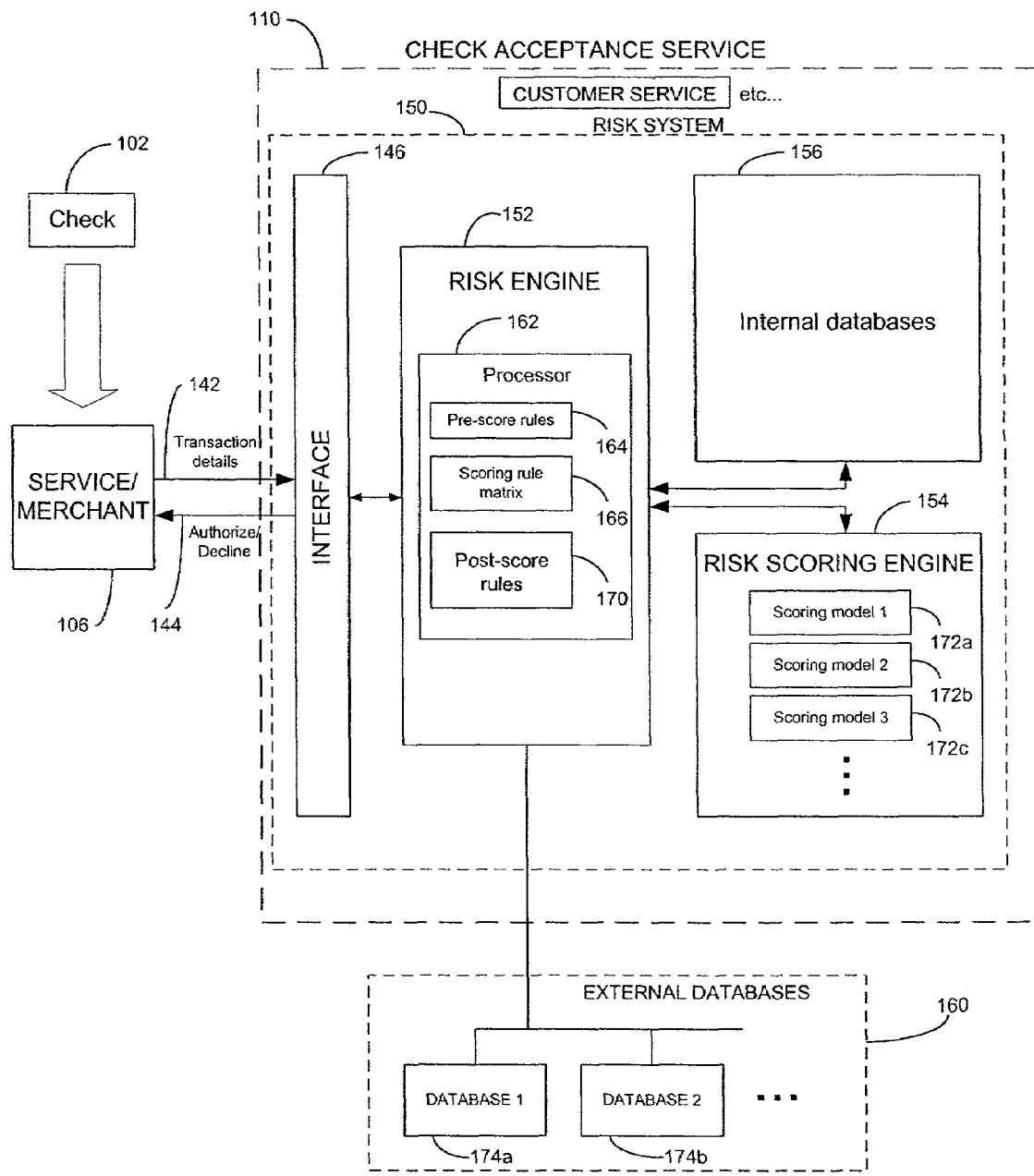
FIG. 2 illustrates a functional block diagram of the check acceptance service comprising a risk system and components therein that determine transaction risks.

FIG. 2 illustrates a schematic block diagram of the check acceptance service 110 illustrating its interaction with the merchant 106 in determining the risk associated with a transaction. The merchant 106 receives the check 102 from a customer, and the merchant 106 interacts with the check acceptance service 110 to determine if the check 102 will be accepted or not. The interaction comprises transaction details 142 submitted by the merchant 106 to the check acceptance service 110, and an authorize/decline decision 144 sent by the check acceptance service 110 to the merchant 106. The transaction details 142 and the authorize/decline decision 144 are described in greater detail below.

The check acceptance service 110 comprises a risk system 150 that evaluates the risk involved with a given transaction. The risk system 150 interacts with the merchant 106 via an interface 146. Specifically, the interface 146 receives the transaction details 142 from the merchant 106 and passes on the information to the risk system 150. The risk system 150 evaluates the transaction in a manner described below and returns a decision to the interface 146 that in turn informs the merchant 106 with the authorize/decline decision 144. The risk system 150 may request additional information about the transaction from the merchant 106 and/or the customer via the interface 146.

The risk system 150 comprises a risk engine 152 that evaluates the transaction risk based on the transaction details 142. The interface 146 may also access and retrieve information about the merchant 106 from the internal databases 156 and determine merchant parameters so as to permit configuring the manner in which the risk assessment is performed by the risk system 150. The merchant parameters may include factors such as limit on the check amount acceptable, and other specific factors that the merchant 106 prefers.

The risk system 150 further comprises a risk scoring engine 154 that determines a risk score at the request of the risk engine 152 and returns the risk score that is indicative of a probable risk of the transaction. The risk scoring engine 154 comprises a plurality of scoring models 172a,b,c, etc., with each engine adapted to address a plurality of possible specific transactions so as to permit improved accuracy in determining the risk score. The different types of scoring models are described below in greater detail. An exemplary transaction that illustrates selective use of the plurality of scoring models is also described below in greater detail.

The risk system 150 further comprises internal databases 156 that may include relevant information such as check writing history of the checkwriter. The risk engine can access the internal databases 156 to facilitate the risk assessment for the transaction.

The risk system 150 is configured so as to permit accessing of external databases 160 which comprises a plurality of databases 174a, b, etc. The external databases 160 permit the risk engine 152 to gather information about the transaction, such as information about the checkwriter not available in the internal databases 156, so as to facilitate the risk assessment.

As shown in FIG. 2, the risk engine 152 comprises a processor 162 that evaluates the transaction risk and determines whether to authorize or decline the transaction in manners described below. The processor 162 comprises pre-score rules 164 that determines whether risk evaluation needs to be performed. As an example, the risk engine has accessed the internal databases 156 for information about the checkwriter, and the checkwriter has a "hard negative" history. Such hard negative history may arise from repeatedly writing bad checks and not paying for the bad checks during the collection processes. The pre-score rules 164 then determine that the transaction is to be declined automatically, due to an unacceptable risk posed by the checkwriter.

The processor 162 further comprises a scoring rule matrix 166 that includes a plurality of rules configured to select a scoring model to run in order to obtain a risk score. Based on the risk score, the scoring rule matrix 166 determines whether the transaction should be authorized, declined, or further evaluated.

One aspect of the invention relates to the processor 162 further comprising post-score rules 170 that evaluates the risk score determined by the scoring matrix 166 to determine if further risk assessment will be performed. In particular the post-score rules 170, based in part on the risk score, selectively access external databases to obtain additional information and selectively invokes the scoring rule matrix that further invokes another scoring model so as to obtain another risk score. In one embodiment, the second risk assessment is performed if the first risk score leads to a transaction decline according to the scoring rule matrix 166. In another embodiment, the second risk assessment is performed if the first risk score falls within a predetermined range of risk score about a cutoff value. It will be appreciated that the second risk assessment performed selectively can be implemented in any number of situations so as to accurately assess the transaction risk.

Figure 3:
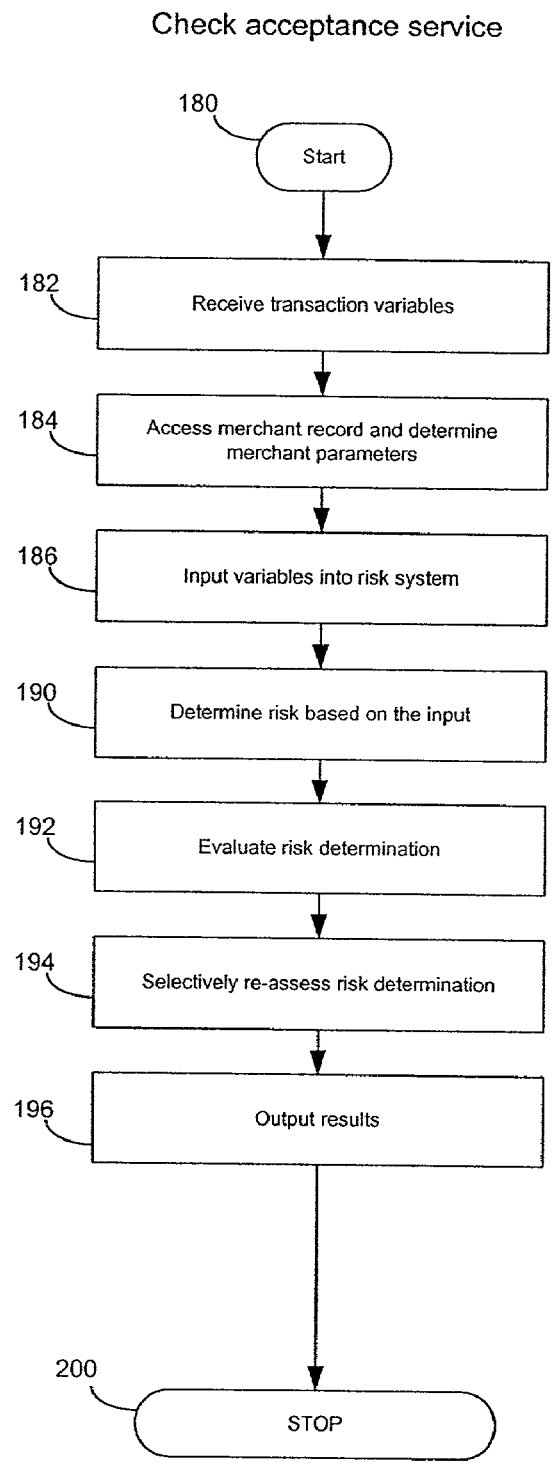
FIG. 3 illustrates a flow chart of a risk assessment process performed by the check acceptance service.

FIG. 3 illustrates a flow chart that describes the function of the check acceptance service (110 in FIG. 2) implementing one aspect of the invention described herein. A check approval process begins at a start state 180. In state 182, the check acceptance service receives transaction variables from the merchant. The check acceptance service, in state 184, then accesses merchant record and determines merchant parameters that affect the manner in which the risk assessment is to be performed. The check acceptance service inputs the variables into the risk system in state 186. In state 190 that follows, the risk system determines the risk based on the input variables. The risk system, in state 192, evaluates the risk determination, and selectively re-assesses the risk evaluation in state 194. The results are output to the merchant in state 196, wherein the results may be either an approval or a decline for the acceptance of the check. The transaction risk assessment is completed by a stop state 200.

Figure 4:
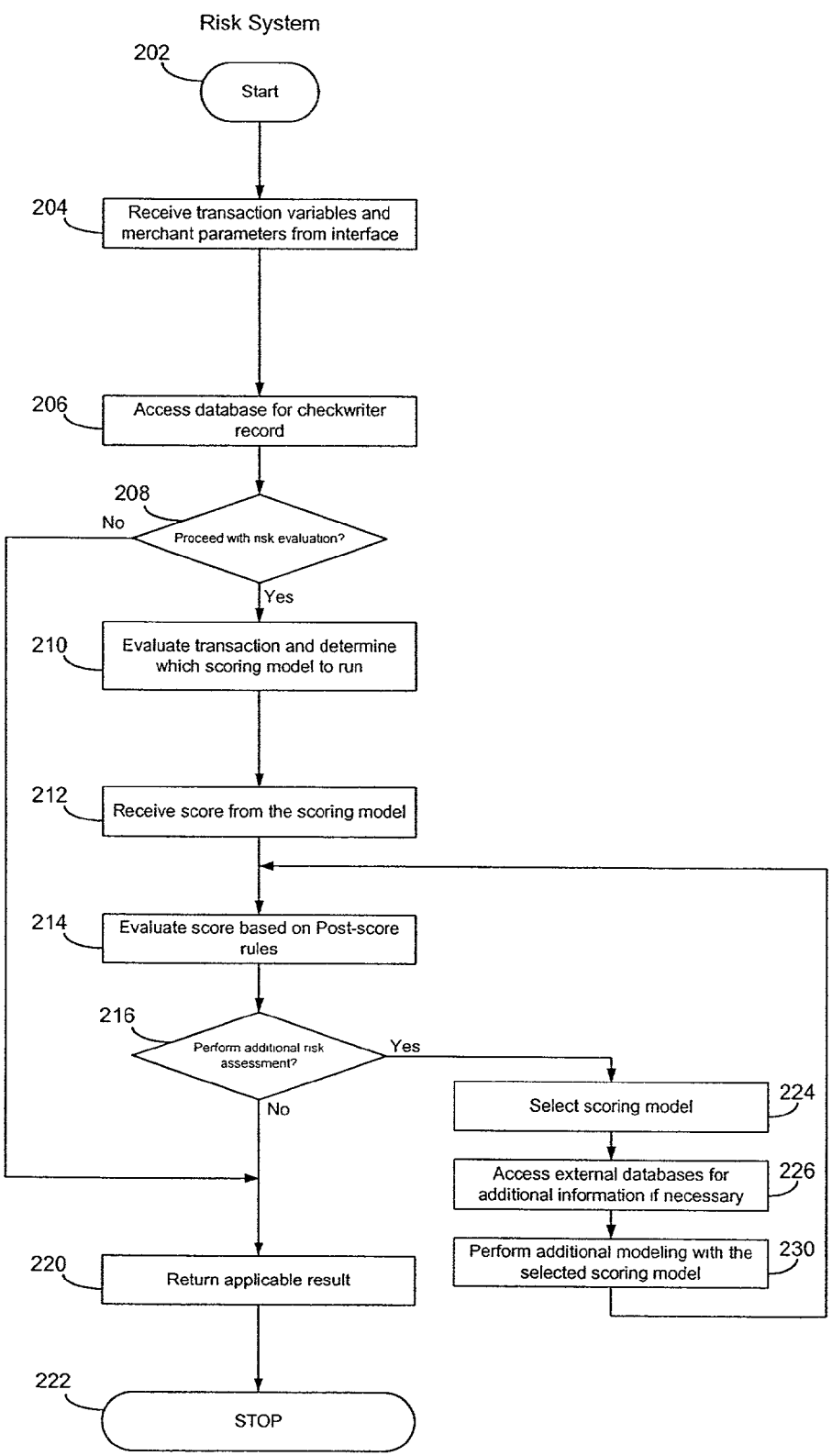
FIG. 4 illustrates a flow chart of the risk assessment process performed by the risk system of the check acceptance service, wherein the risk system performs additional risk assessment after a standard risk assessment.

FIG. 4 illustrates a flow chart that describes the function of the risk system (150 in FIG. 2) that utilizes post-score rules to selectively re-assess the transaction risk according to one aspect of the invention. The process described in the flow chart of FIG. 4 can represent states 186, 190, 192, and 194 in the flow chart of FIG. 3. The transaction risk assessment begins at a start state 202. In state 204, the risk system receives transaction variables and merchant parameters from the interface. In state 206 that follows, the risk system accesses the databases for checkwriter's record. The risk system decides in a decision state 208 whether to proceed with the risk evaluation, based on the pre-score rules described above. An answer of 'NO' leads to an automatic return of applicable result to the interface in state 220, and the process terminates at a stop state 222. For example, a hard negative information about the checkwriter can automatically lead to a decline decision without further action by the risk system.

In the decision state 208, an answer of 'YES' leads to state 210 wherein the risk system evaluates the transaction and determines which scoring model to run based on the transaction variables and the rules of the scoring rule matrix. The scoring model of the risk system scores the transaction risk and returns the risk score in state 212. In state 214 that follows the risk system evaluates the risk score based on the post-score rules, and determines in a decision state 216 whether to perform additional risk assessment. An answer of 'NO' leads to the state 220 wherein the applicable result is returned to the interface. An answer of 'YES' causes the risk system to select another scoring model for an additional risk assessment in state 224. In state 226 that follows, the risk system may access external databases for additional information if necessary. In state 230, the risk system performs the additional risk modeling with the selected scoring model. The process loops back to the state 214 wherein a new risk score resulting from the additional risk modeling is evaluated based on the post-score rules. The decision state 216 then determines whether further risk assessment is needed to return the applicable result to the interface, which in turn notifies the merchant.

In one embodiment, the additional risk assessment performed during the states 224, 226, and 230 is performed once such that the applicable result is returned after a total of two risk assessments. In another embodiment, the additional risk assessment is performed more than once if needed. It will be appreciated that any selective action taken by the risk system according to the post-score rules should be considered to be consistent with the spirit of the invention. Thus, even if no additional risk assessment if performed based on the initial risk score and the post-score rule, due to the initial risk score being either too risky or sufficiently low risk for example, the selective decision process performed by the risk system is consistent with one aspect of the invention described herein.

Figure 5:
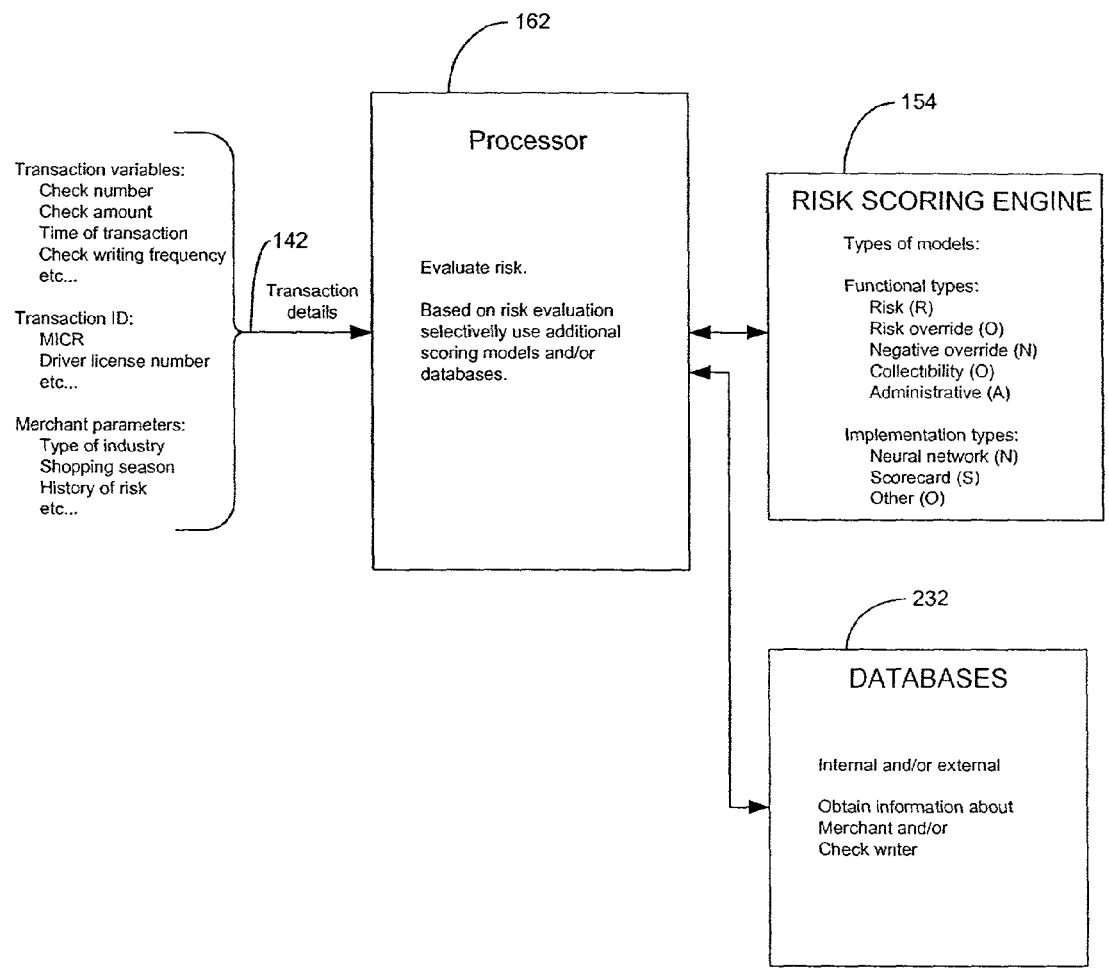
FIG. 5 illustrates a functional block diagram of a processor of the risk system, wherein the processor performs a post-score process that selectively utilizes various scoring models and databases available based on the evaluation of the standard risk assessment.

FIG. 5 illustrates the processor 162 receiving the transaction details 142 and evaluating the transaction risk by utilizing the risk scoring engine 154 and if necessary the databases 232. As referred to above, one aspect of the invention relates to the processor 162 that evaluates risk and based on the risk evaluation, selectively uses additional risk engines. The transaction details 142 input into the processor 162 can comprise of a plurality of variables that characterize many types of transactions with different associated risks. Thus the processor 162, by selectively using additional risk engines, permits the risk system to advantageously determine more accurately the risk for a given specific transaction.

The transaction details can comprise of, but is not limited to, transaction variables, transaction identifications, and merchant parameters. The transaction variables comprise variables such as check number, check amount, and time of transaction. The transaction identifications comprise identifying information such as the check's magnetic ink character recognition (MICR) pattern and the checkwriter's driver license number. The merchant parameters comprise information about the merchant such as type of industry, shopping season, and history of risk. It will be appreciated that these specific transaction details are exemplary, and are not meant to limit the content of the transaction details. In one embodiment, the transaction details comprises a total of approximately 30 factors. In another embodiment, the processor 162 processes transaction related details comprising approximately 300 to 400 factors. It will also be appreciated that within the specific transaction details listed above, it is possible to construct a plurality of possible combinations to characterize a transaction.

To accommodate the wide variety of transaction types, the risk scoring engine 154 typically comprises different functional and/or implementation types of scoring models. In one embodiment, the functional types of models comprises models configured to assess risk, risk override, negative history override, collectibility, and administrative aspects of the transaction. For example, the risk-configured model determines a risk score based on the transaction details. The risk override-configured model determines a risk score associated with overturning the initial decline decision that was based on the initial risk score. The negative override-configured model determines a risk associated with overturning the initial decline that was based on some negative factors of the transaction. The collectibility-configured model determines a likelihood of collecting funds from the checkwriter in the event that the check does not clear. The administrative-configured model determines a course of action (electronic or paper check transaction, for example) based on parameters dictated at the administrative level of the check acceptance service.

The various functional types of scoring models described above can be implemented as a neural network, a scorecard function, or any number of other possible implementations. As is understood in the art, a neural network comprises a plurality of interconnected processors that are tied together with weighted connections. The scorecard function may comprise a linear modeling algorithm that calculates a score based on an input.

In one embodiment of the invention, the risk system comprises approximately 1200 different scoring models. Approximately 66 are neural network types and the rest are scorecard types. The neural network types may be purchased as a module from an external source, or may be programmed within the check acceptance service. In one embodiment, the scorecard functions are C-based software modules.

In one embodiment of the invention, the various scoring models, such as those described above, are implemented as software modules in a computer system. The rules implemented in the processor 162 are in the form of a program logic.

In general, it will be appreciated that the processors comprise, by way of example, computers, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Figure 6:
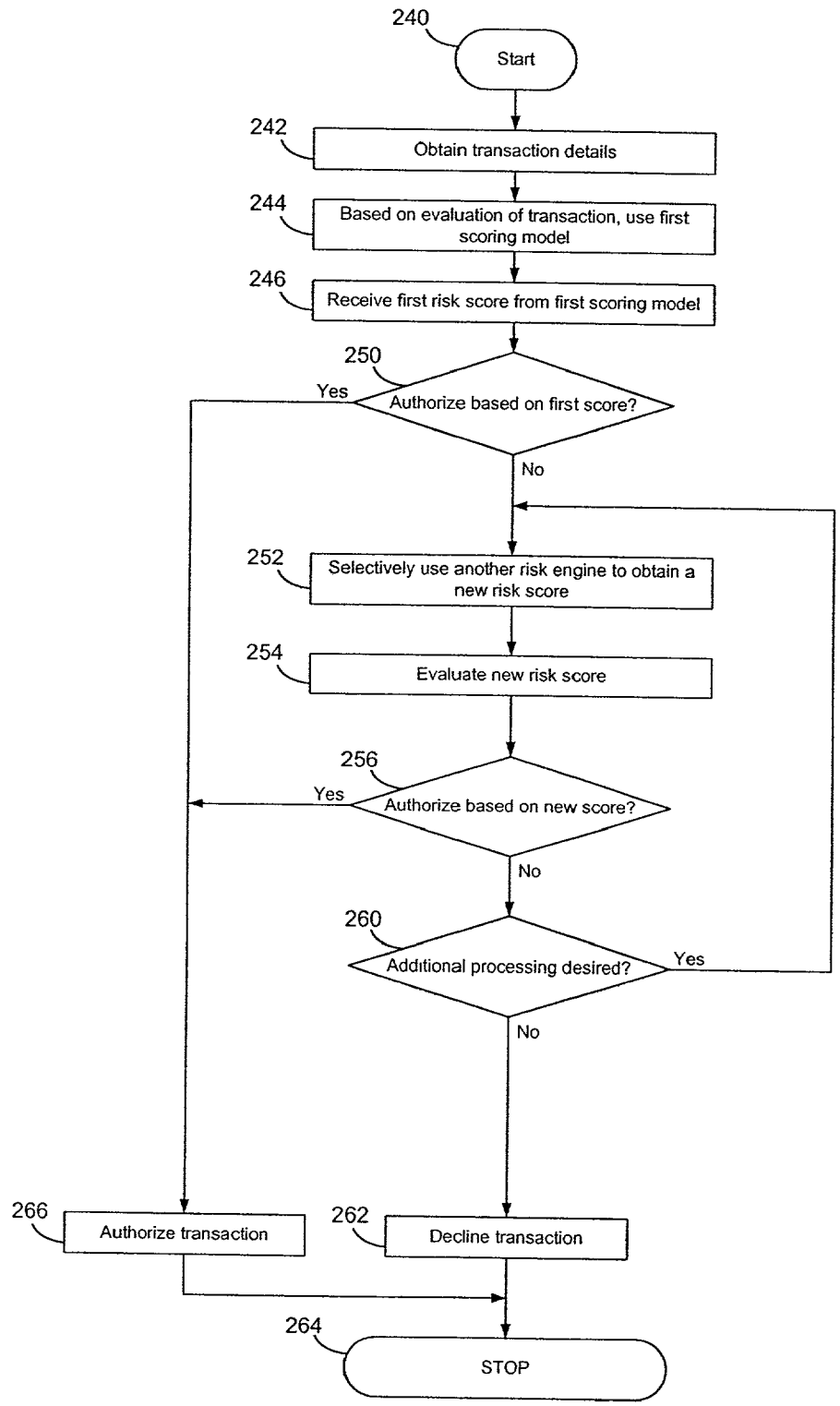
FIG. 6 illustrates a flow chart of one possible post-score process performed by the processor.

FIG. 6 illustrates a post-score process performed by the processor 162 (FIG. 5) that exemplifies one possible implementation of one embodiment of the invention. The process begins at a start state 240 and in state 242 the processor obtains transaction details. In state 244 that follows, the processor evaluates the transaction and based on the evaluation, the processor uses a first scoring model to obtain a first risk score. In state 246, the processor receives the first risk score from the first scoring model. The processor decides in a decision state 250 whether to authorize the transaction based on the first risk score. An answer of 'YES' leads to state 266 wherein the transaction is authorized and the process ends at a stop state 264.

An answer of 'NO' in the decision state 250 causes the processor to selectively use another scoring model to obtain a new risk score in state 252. In state 254 that follows, the processor evaluates the new risk score and decides in a decision state 256 whether to authorize the transaction based on the new risk score. An answer of 'YES' leads the approval of transaction in state 266, and the process ends at the stop state 264. An answer of 'NO' causes the processor to decide if additional processing is desired in a decision state 260. An answer of 'YES' causes the process to loop back to the state 252 such that the processor performs another risk assessment. An answer of 'NO' leads to state 262 wherein the transaction is declined, followed by end of process at the stop state 264.

In one embodiment of the invention, the processor performs one additional risk assessment after the first risk score before outputting a decision. In another embodiment, the processor may perform a plurality of additional risk assessments in order to accurately assess the transaction risk. Such multiple assessments may be performed, for example, on transactions that involve large check amounts. It will be appreciated that the processor may perform any number of additional risk assessments on any number of types of transactions without departing from the spirit of the invention.

FIG. 7 illustrates a table 300 that lists some of the possible variables that may be used in the risk assessment. The meaning of the variables listed in the table 300 are listed in the 'Comment' column. Many of the listed variables are used to describe an exemplary risk assessment using the pre-score rules, scoring rule matrix, and the post-score rules of the risk engine (152 in FIG. 2) below.

Figure 8:
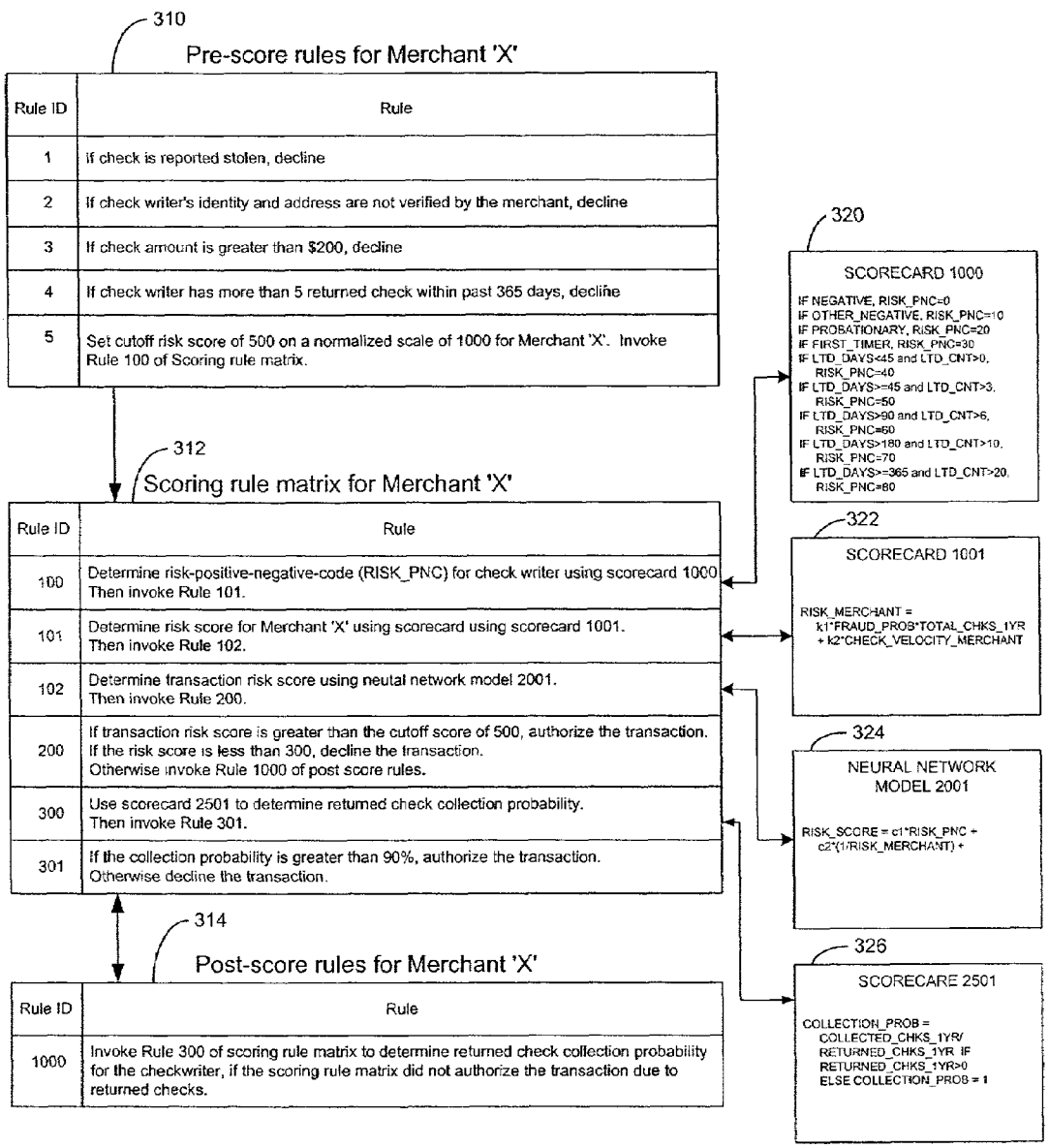
FIG. 8 illustrates an exemplary risk assessment for a check transaction requested by an exemplary merchant.

FIG. 8 illustrates an exemplary risk assessment that is configured according to the preferences of an exemplary merchant 'X'. As referred to above in reference to FIG. 2, the risk system retrieves information about the merchant from the databases when the risk system receives an approval request from the merchant. As shown in FIG. 8, a merchant-configured pre-score rules 310, a merchant-configured scoring rule matrix 312, and a merchant-configured post-score rules 314 comprise plurality of rules. Some rules invoke other rules based on simple decisions, and some rules invoke scoring models to determine risk related factors. It will be emphasized that the rules and the scoring models illustrated and described in reference to FIG. 8 are exemplary and are not intended to limit the scope of the invention. As described above in reference to FIG. 5, one embodiment of the risk system comprises approximately 1200 scoring models. Thus it will be appreciated that the rules and scoring models illustrated in FIG. 8 and described below are exemplary and represent one of many possible transactional situations.

The merchant-configured pre-score rules 310 comprise a plurality of rules that automatically decline high risk transactions and set certain parameters for subsequent use. Specifically, checks that are reported stolen are decline according to rule-1. Transactions that does not verify checkwriter's identity and address are also declined according to rule 2. Rule-3 states that merchant 'X' has set an upper limit of $200 on checks to be authorized; thus, any check in excess of $200 is declined if written to merchant 'X'. Checks from checkwriters that have more than 5 returned checks within the past year are also declined according to rule-4. In rule-5, merchant 'X' has set a cutoff risk score of 500 on a normalized risk scale of 1000. If the transaction satisfies all the rules in the merchant-configured pre-score rules 310, the transaction processing is transferred to rule-100 of the merchant-configured scoring rule matrix 312.

As described above, the scoring rule matrix evaluates the transaction and determines the first risk score associated with the transaction. In the exemplary merchant-configured scoring rule matrix 312, the rule-100 determines a variable RISK_PNC (see FIG. 7 for meaning) by using a scorecard-1000 320. The variable RISK_PNC is calculated based on variables LTD_DAYS and LTD_CNT that are indicative of the checkwriter's history. In one implementation, RISK_PNC is assigned an integer number in multiples of 10s from 0 to 80, with 80 representing an ideal checkwriter, and lower values indicative of progressively higher risks. It will be appreciated that the variable RISK_PNC and other variables described herein are used with the intention of describing an exemplary risk evaluation process that may also use other variables not specifically mentioned.

The RISK_PNC of 0 is assigned when a checkwriter has a negative history such as an unpaid returned check. A value of 10 is assigned when a checkwriter has other negative history other than the unpaid check. A value of 20 is assigned for a checkwriter that is in a probationary state, such as transitioning out of the RISK_PNC=10 status. A value of 30 is assigned for a checkwriter whose check is assessed by the check acceptance service for the first time so as to a new entry into the service's databases. A value of 40 is assigned for a checkwriter that has been in the service's databases for less than 45 days (45 LTD_DAYS) and has had at least 1 check processed by the service (1 LTD_CNT). A score of 50 is assigned to a checkwriter that has LTD_DAYS of 45 days or more and LTD_CNT of more than 3. A value of 60 is for LTD_DAYS of more than 90 and LTD_CNT of more than 6. A value of 70 is for LTD_DAYS of more than 180 and LTD_CNT of more than 10. An ideal value of 80 is for a checkwriter that has LTD_DAYS of at least 365 days and LTD_CNT of more than 20. The RISK_PNC for a given checkwriter thus increases as time passes and checks are cleared successfully. The RISK_PNC, however, can drop back down to 0 when a checkwriter acquires a hard negative such as not paying for a returned check.

The scorecard-1000 320 returns the value for the variable RISK_PNC to the merchant-configured scoring rule matrix 312 wherein rule-100 invokes rule-101. Rule-101 determines a risk score for merchant 'X' by using a scorecard-1001 322. The scorecard-1001 322 determines the risk score for the merchant (RISK_MERCHANT) by combining fraud probability, annual check volume, and the current rate at which check transactions are being requested (CHECK_VELOCITY_MERCHANT) in a weighted manner. For example, if the CHECK_VELOCITY MERCHANT value is substantially higher than the average value as indicated by merchant 'X's profile, it may indicate an irregular higher risk activity, such as fraud.

The scorecard-1001 322 returns the value for the variable RISK_MERCHANT to the matrix 312 wherein rule-101 invokes rule-102. Rule-102 determines a transaction risk score (RISK_SCORE) by using a neural network model-2001 324. The model-2001 324 calculates RISK_SCORE by combining RISK_PNC and RISK_MERCHANT with other factors in a weighted manner. The model-2001 324 returns the value for the variable RISK_SCORE to the matrix 312 wherein rule-102 invokes rule-200.

According to rule-200, the transaction is authorized if RISK_SCORE is greater than the cutoff risk score of 500. If RISK_SCORE is less than 300, the transaction is declined. Otherwise, rule-1000 of the merchant-configured post-score rules 314 is invoked.

The exemplary post-score rules 314 re-evaluates what would traditionally be considered as a declined transaction. Specifically, the post-score rules 314 illustrated in FIG. 8 relate to a situation that deals with returned checks. In rule-1000, the scoring rule matrix is invoked again to determine a probability of returned check collection. In particular, rule-300 of the scoring rule matrix is invoked.

Rule-300 invokes a scorecard-2501 326 to determine the probability that funds can be collected from the checkwriter in the event that the check is returned. The scorecard-2501 calculates the ratio of number of collected checks during the past year (COLLECTED_CHKS_1YR) to number of returned checks during the past year (RETURNED_CHKS_1YR). The scorecard 2501 returns the probability to the rule-300, wherein rule-301 is invoked with the obtained probability.

According to rule-301, if the collection probability (COLLECTION_PROB) is greater than 90%, and the RISK_SCORE from the matrix 312 being low was due to returned checks, the transaction is authorized; otherwise the transaction is declined. The exemplary risk assessment process is now completed.

With the exemplary risk assessment configured as described above and illustrated in FIG. 8, an exemplary check transaction is now described for an exemplary customer 'Y' purchasing weekly grocery at the grocer merchant 'X'. Customer 'Y' has had 3 checks returned in the past year due to careless bookkeeping. In each of the 3 returned check cases, however, customer 'Y' has promptly paid for the returned check, plus a fee of $25 per check. Today, a check in the amount of $120 is written to pay for the grocery, and the cashier initiates the check approval process.

The check written by customer 'Y' satisfies all 5 pre-score rules 310, and the risk assessment proceeds to the scoring rule matrix 312. Due to the 3 returned check, the risk score for the transaction is determined to be 400 according to rule-102. Thus according to rule-200, further assessment by rule-1000 of the post-score rules 314 is invoked.

Since the risk score of 400 is due to the 3 returned checks, rule-1000 invokes rule-300 of the scoring rule matrix to evaluate customer 'Y's check return probability. Rule-300 is applied, and since customer 'Y' has paid for all the returned checks, the probability of collection is determined to be 100% by the scorecard 2501. And since the risk score of 400 is due to the previous returned checks, and the probability of collection has been determined to be greater than 90%, a most likely beneficial transaction is authorized.

It will be appreciated that by selective application of rules and use of risk engines, as exemplified above, some transactions that would have been declined using traditional risk assessment are authorized based on certain factors. Specifically, the factors that determine such approvals may be configured by the check acceptance and the merchant to be beneficial.

What is claimed is:

1. A computer-implemented method for processing financial transactions comprising:
    selecting, via a processor, a first scoring model from a plurality of scoring models for determining a first risk score for a financial transaction; and
    determining based at least in part on the first risk score, whether to determine a second risk score with a second scoring model different from the first scoring model, and wherein the second scoring model is selected from the plurality of scoring models, via a processor, based at least in part on a post-score rule.

2. The method of claim 1, wherein the financial transaction is a check transaction.

3. The method of claim 1, wherein determining the first risk score comprises obtaining data associated with the financial transaction and evaluating the data.

4. The method of claim 3, wherein obtaining the data comprises receiving a transaction authorization request from a merchant.

5. The method of claim 3, wherein evaluating the transaction comprises invoking a first scoring model from a plurality of scoring models, wherein the first scoring model calculates the first risk score.

6. The method of claim 1, wherein determining whether to determine the second risk score comprises evaluating the first risk score, wherein the second risk score is determined if the first risk score is lower than a predetermined first cutoff value, wherein the transaction is authorized otherwise.

7. The method of claim 6 further comprising:
   determining the second risk score with the second scoring model; and
   determining whether to authorize the transaction based at least in part on the second risk score.

8. The method of claim 7, wherein determining the second risk score comprises invoking the second scoring model from a plurality of scoring models, wherein the second scoring model calculates the second risk score.

9. The method of claim 7, wherein determining whether to authorize the transaction comprises evaluating the second risk score, wherein the transaction is authorized if the second risk score is higher than a predetermined second cutoff score.

* * * * *

UNITED STATES PATENT AND TRADEMARK OFFICE
CERTIFICATE OF CORRECTION

| | | |
|---|---|---|
| PATENT NO. | : 7,668,776 B1 | Page 1 of 1 |
| APPLICATION NO. | : 10/041765 | |
| DATED | : February 23, 2010 | |
| INVENTOR(S) | : Daniel Ahles | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1756 days.

Signed and Sealed this

Seventh Day of December, 2010

David J. Kappos
*Director of the United States Patent and Trademark Office*